United States Patent [19]

Evitt

[11] Patent Number: 4,767,813

[45] Date of Patent: Aug. 30, 1988

[54] HIGH SOLIDS PSA COMPOUNDS

[75] Inventor: William T. Evitt, Chattanooga, Tenn.

[73] Assignee: Polysar Financial Services S.A., Fribourg, Switzerland

[21] Appl. No.: 28,912

[22] Filed: Mar. 23, 1987

[51] Int. Cl.$^4$ ............................ C08J 23/00; C08J 5/09
[52] U.S. Cl. ..................................... 524/271; 524/270; 524/272; 524/273; 524/284; 524/296; 524/313; 524/293; 524/386
[58] Field of Search ............... 524/271, 272, 273, 270, 524/284, 296, 313, 293, 386

[56] References Cited

U.S. PATENT DOCUMENTS

| | | | |
|---|---|---|---|
| 4,013,824 | 3/1977 | Uraneck et al. | 526/205 |
| 4,064,337 | 12/1977 | Uraneck et al. | 526/205 |
| 4,189,419 | 2/1980 | Takemoto et al. | 524/273 |
| 4,280,942 | 7/1981 | Green | 524/271 |
| 4,419,481 | 12/1983 | Schwartz | 524/273 |
| 4,508,864 | 4/1985 | Lee | 524/187 |
| 4,540,739 | 9/1985 | Midgley | 524/764 |
| 4,590,230 | 5/1986 | Kamada et al. | 524/271 |
| 4,654,388 | 3/1987 | Lofgren | 524/272 |

FOREIGN PATENT DOCUMENTS 0084829 8/1983 European Pat. Off.

*Primary Examiner*—Harold D. Anderson
*Assistant Examiner*—Dennis R. Daley
*Attorney, Agent, or Firm*—Stevens, Davis, Miller & Mosher

[57] ABSTRACT

High solids aqueous based pressure sensitive adhesives may be prepared by directly emulsifying the tackifier resin into a polymeric latex provided the tackifier is heated, plasticized and emulsified and mixed with the latex on a high shear mixer. This gives an adhesive which is faster drying and gives comparable properties to lower solids adhesives.

11 Claims, No Drawings

HIGH SOLIDS PSA COMPOUNDS

BACKGROUND OF THE INVENTION

The present invention relates to high solids aqueous based pressure sensitive adhesives.

In recent years there has been a trend toward the reduction of the amount of solvents used in pressure sensitive adhesives. There have been a number of patents which disclose aqueous based pressure sensitive adhesives including U.S. Pat. Nos. 4,189,419 issued Feb. 18, 1980 assigned to Avery International Corporation; 4,508,864 issued Apr. 2, 1985 assigned to Polysar Limited; and 4,540,739 issued Sept. 10, 1985 assigned to Polysar Limited. Generally, this art discloses pressure sensitive adhesives which are a mixture of an emulsion of a polymer and a tackifier resin.

One of the difficulties with these types of systems is the incorporation of the tackifier into the polymeric emulsion. The tackifier resins may be dispersed in an organic solvent or diluent and mixed with the emulsion, then the organic solvent or diluent is driven off. While this is effective it defeats one of the purposes of going to aqueous based pressure sensitive adhesives, specifically to reduce such organic volatiles. The tackifier resin may be added to the polymeric emulsion in the form of an aqueous emulsion or dispersion. Such a procedure has a number of drawbacks. The blending of two aqueous dispersions tends to result in a mixture having a solids content in between that of the original dispersions. As a result the adhesives contain an undesirably high amount of water. Additionally, in preparing the tackifier emulsion surfactants are usually required. These surfactants usually remain in the resulting adhesive making it sensitive to moisture.

European Patent Application No. 0,084,829 published 03.08.83 in the name of Hercules Incorporated has attempted to address this problem. This patent application discloses a process for making a water dispersable tackifier resin comprising heating the resin and adding thereto from about 3 to 10 percent of a non ionic emulsifier. Preferably the non ionic emulsifier is a polyalkylene alkyl phenol, in which the polyalkylene radical comprises from 4 to 9 alkylene oxide units. The amount of emulsifier used in accordance with the present invention is lower than that disclosed in E.P. Application No. 0,084,829. Additionally, the present invention is directed to blending the tackifier directly with an emulsion of a polymer while the Hercules disclosure teaches that it is preferable to disperse the resin in water.

SUMMARY OF THE INVENTION

The present invention provides a process for preparing an aqueous based pressure sensitive adhesive comprising per 100 parts by weight of water, from about 80 to 120 parts by weight of a mixture comprising from about 15 to 85 parts by weight of one or more synthetic polymers; and from about 85 to 15 parts by weight of one or more water insoluble tackifier resins having a Tg greater than about 10° C.; from about 2.0 to about 6.0 parts by weight of one or more plasticizers; from about 0.4 to about 1.2 parts by weight of one or more emulsifiers; from about 0.2 to about 0.6 parts by weight of one or more alkali metal hydroxides; from about 0.5 to 0.15 parts by weight of a non silicone defoamer, and from about 1 to 2 parts by weight of a dispersant which process comprises heating said tackifier resin above its Tg and adding thereto said plasticizer and said emulsifier; compounding an emulsion of about 60 to 40 percent by weight of said polymer, said alkali metal hydroxide, dispersant and said defoamer; blending said compound with the mixture of said hot tackifier, plasticizer and emulsifier under conditions of very high shear and cooling the resulting aqueous based pressure sensitive adhesive to room temperature under mild agitation.

DESCRIPTION OF PREFERRED EMBODIMENTS

The polymers which are useful in accordance with the present invention may be characterized as styrene-butadiene type polymers; polybutadiene type polymers; acrylate type polymers; ethylene-vinyl ester type polymers, ethylene-acrylate type polymers and nitrile type polymers. Preferably these polymers contain a monomer containing a functional group such as a carboxylic acid; ester, amide or aldehyde.

Suitable styrene-butadiene polymers and polybutadiene polymers may be characterized as polymers comprising:

(i) from 0 to 60, preferably from 25 to 40, weight percent of a mixture of from 100 to 65, preferably 100 to 80, weight percent of a $C_{8-12}$ vinyl or vinylidene aromatic monomer which may be unsubstituted or substituted by a $C_{1-4}$ alkyl radical or a chlorine or bromine atom and from 0 to 35, preferably from 0 to 20 weight percent of a $C_{2-8}$ alkenyl nitrile; and (ii) from about 40 to 99, preferably from 75 to 60 weight percent of a mixture comprising 100 to 50, preferably 100 to 80, weight percent of a $C_{4-8}$ conjugated diolefin which may be unsubstituted or substituted by a chlorine atom and from 50 to 0, preferably less than about 20 weight percent of one or more monomers selected from the group consisting of $C_{1-8}$ alkyl or hydroxy alkyl esters of acrylic or methacrylic acid or $C_{2-8}$ alkenyl or hydroxy alkenyl esters of $C_{1-8}$ saturated carboxylic acids.

As noted above preferably such polymers may further comprise one or more copolymerizable monomers containing a functional group. When present the functional monomers are present in an amount from 0.5 to 10, preferably 0.5 to 5 weight percent of one or more monomers selected from the group consisting of:

(1) one or more $C_{3-6}$ ethylenically unsaturated carboxylic acids;

(2) one or more amides of $C_{3-6}$ ethylenically unsaturated carboxylic acids, which amide may be unsubstituted or substituted at the nitrogen atom by a $C_{1-4}$ alkyl or hydroxy alkyl radical;

(3) one or more $C_{3-6}$ ethylenically unsaturated aldehydes; and (4) one or more $C_{1-6}$ alkyl or hydroxy alkyl esters of $C_{3-6}$ ethylenially unsaturated carboxylic acids.;

The styrene butadiene polymers preferably have a molecular weight distribution so that from about 20 to 55 weight percent of the polymer has a molecular weight greater than 320,000. The use of suitable modifiers or molecular weight control agents or chain transfer agents to control the molecular weight distribution of a polymer is well known to those skilled in the art. U.S. Pat. Nos. 4,013,824 and 4,064,337 issued Mar. 22, 1977 and Dec. 20, 1977, respectively, assigned to Phillips Petroleum discloses such procedures. The disclosures of both of these patents are herein incorporated by reference.

Suitable $C_{8-12}$ vinyl aromatic monomers include styrene, alpha methyl styrene and chlorostyrene. Part of the aromatic monomer may be replaced by small amounts of an alkenyl nitrile such as acrylonitrile.

Suitable conjugated diolefins include the aliphatic diolefins such as 1,3-butadiene, isoprene and their chlorinated homologues. Up to about half, preferably less than about 20 percent of the conjugated diolefin may be replaced with an ester of acrylic or methacrylic acid; or a vinyl ester of a saturated carboxylic acid. Suitable esters of acrylic or methacrylic acid include methyl acrylate, methyl methacrylate, ethyl acrylate, ethyl methacrylate, hydroxyethyl acrylate, hydroxy ethyl methacrylate, and the higher branched esters such as ethyl hexyl acrylate and ethyl hexyl methacrylate. Suitable vinyl esters include vinyl acetate.

Commercially available functional monomers include one or more monomers selected from the group consisting of acrylic acid, methacrylic acid, itaconic acid, fumaric acid, methyl acrylate, methyl methacrylate, ethyl acrylate, ethyl methacrylate, butyl acrylate, ethyl hexyl methacrylate, ethyl hexyl acrylate, acrylamide, methacrylamide, N-methylol acrylamide, N-methylol methacrylamide, acrolein and the like.

Athough the above polymers have been characterized as styrene-butadiene type polymers it is clear they may contain minor amounts of acrylates, vinyl cyanides, (alkenyl nitriles), vinyl esters and functional monomers.

The acrylate type polymers may be characterized as polymers consisting of from about 60 to 99.5, preferably from about 85 to 94.5 weight percent of a $C_{1-8}$ alkyl or hydroxyl alkyl ester of acrylic and methacrylic acid; from about 10 to 40, preferably from about 5 to 15 weight percent of one or more monomers selected from the group consisting of $C_{8-12}$ vinyl or vinylidene aromatic monomers, which may be unsubstituted or substituted by a $C_{1-4}$ alkyl radical or a chlorine, or bromine atom, and $C_{3-6}$ alkenyl nitriles and acrylic and methacrylic acid. The acrylate polymers may optionally further contain from about 0.5 to 10, preferably less than 5 weight percent of a functional monomer other than a $C_{1-8}$ alkyl or hydroxy alkyl ester of acrylic or methacrylic acid; or those acids per se.

Suitable monomers have been discussed above in relation to the styrene-butadiene type polymers. The acrylate polymers may also have a controlled molecular weight distribution as discussed in relation to the styrene butadiene type polymers.

The ethylene-vinyl ester type polymers may be characterized as comprising up to about 40, preferably from about 5 to 25 weight percent of a $C_{2-3}$ mono olefin; at least about 60, preferably from about 74.5 to 94.5 weight percent of a $C_{2-8}$ alkenyl or hydroxy alkenyl ester of a $C_{1-8}$ saturated carboxylic acid; and optionally from about 0.5 to 10, preferably from 0.5 to 5 weight percent of one or more functional monomers.

Suitable alpha-olefins are ethylene and propylene.

Suitable vinyl esters and functional monomers have been discussed under styrene-butadiene type polymers above.

The ethylene acrylate polymers are similar to the ethylene vinyl acetate polymers except that all or a part of the vinyl esters are replaced with (meth)acrylate esters. Suitable (meth)acrylate esters have been discussed above.

While the olefin polymers have been described as either olefin-vinyl esters or olefin-acrylate type polymers it is possible to use mixtures of both vinyl esters and acrylic esters in conjunction with the alpha olefins and optionally the functional monomers.

Suitable nitrile polymers comprise:
from 20 to 40 weight percent of a $C_{3-8}$ alkenyl nitrile;
from 79.5 to 60 weight percent of a $C_{4-8}$ conjugated diolefin; and
optionally from 0.5 to 10 weight percent of one or more of the above functional monomers.

Preferred nitriles are acrylonitrile. Preferred dienes are butadiene and isoprene. Suitable functional monomerx have been discussed above.

The tackifier may be rosin or a derivative of rosin having a ring and ball softening temperature from about 25° to 110° C., preferably from about 50° to 110° C. Suitable tackifiers include rosin, hydrogenated rosin esters, glycerol of rosin such as triglycerol rosin esters, $C_{2-3}$ alkylene esters of rosin such as triethylene glycol esters of rosin and tripropylene glycol esters of rosin; rosin salts, disproportionated rosin salts, pentaerythritol and the polyterpene resins including alpha and beta pinene. Suitable resins are sold under the tradenames Staybelite Ester 3, Staybelite Ester 10, Pentalyn H and Hercolyn D.

The tackifier resin may be a $C_5$ or $C_9$ synthetic tackifier resin having a ring and ball softening point from about 10° to 100° C., preferably from about 50° to 100° C. Suitable resins are sold under the tradenames Piccovar, Hercotac, Picconal and Piccolyte. These tackifiers are polymerized from $C_9$ monomers, preferably aromatic and $C_5$ monomers, preferably aliphatic.

The tackifier is softened with a conventional plasticizer. These generally include the phthalate, benzoate, tallate esters, and glycerol derivatives. Suitable plasticizers include di-alkyl phthalate, such as di-octyl phthalate; alkyl aromatic phthalates such as butyl benzyl phthalate; alkyl tallates such as octyl tallate, vegetable oils such as castor oil, palm oil, glycerol and glycerol esters; dibenzoates such as dipropylene glycol dibenzoate and diethylene glycol dibenzoate; and distilled tall oils. The plasticizer is used in an amount from about 5 to 10 percent based on the weight of the tackifier resin.

The tackifier resin and the plasticizer are mixed and warmed until the plasticizer softens the tackifier. Then a small amount of emulsifier is added directly to the softened resin. The emulsifier is added in an amount from about 1 to 2 percent based on the weight of the tackifier. The emulsifier should be compatible with the charge on the latex. Generally, the emulsifier should be non ionic or anionic. A particularly preferred class of emulsifier comprises the alkali metal, preferably potassium, salts of disproportionate rosin. A suitable emulsifier is sold under the tradename Foral AX. The softened mixture of tackifier resin, emulsifier and plasticizer is then mixed with a compound of the polymer.

The polymer compound comprises 100 parts by weight of water, from about 40 to 60 parts by weight of the polymer, from about 0.2 to about 0.6 parts by weight of one or more alkali metal hydroxides, from 1 to 2 parts by weight of a dispersant, and from about 0.5 to 0.15 parts by weight of a non silicone defoamer. Preferably the defoamer is of a fugitive or volatile nature.

Preferably the polymer compound is mixed with hot tackifier composition to provide a weight ratio of tackifier to polymer from 1:6 to 3:2, preferably from 1:4 to 1:1. Thus from about 15 to 85 parts by weight of tackifier may be mixed with from about 85 to 15 parts by weight of polymer.

The polymer compound and the hot tackifier mixtures are mixed under high shear. Preferably the polymer compound and the tackifier are circulated through a colloid mill or similar type of high shear equipment to form a uniform dispersion, generally for not longer than about 10 minutes. The resulting dispersion is then left to cool at room temperature under mild agitation.

The following example is intended to illustrate the invention and is not intended to limit it In the example, the parts are parts by weight unless otherwise specified.

EXAMPLE 1

A tackifier mixture was prepared as follows:

fifty parts of a hydrogenated rosin ester was heated in an oil bath to about 80° C., at which temperature it became very soft. To the softened rosin were added 2.5 parts of dioctyl phthalate and 0.5 parts of the potassium salt of disproportionated rosin, under mild agitation.

A commercially available carboxylated styrenebutadiene latex sold under the trademark POLYSAR 3222 at about 50 percent solids (i.e. 50 parts of water—50 parts of polymer) was compounded with 0.25 parts dry weight of potassium hydroxide, 1 part of a dispersant sold under the trademark Igepal CO-630; and 0.2 parts of non silicone defoamer sold under the trademark Nopco 8034. The latex compound was passed through a Gifford-Wood (trademark) Colloid Mill. Then the hot mixture of hydrogenated rosin ester was added to the latex compound and the resulting admixture was circulated through the colloid mixture until a uniform compound was obtained, about 10 minutes. The resulting adhesive was placed in a container and coolec to room temperature under mild agitation.

The resulting adhesive had a solids content of about 65 percent. The adhesive was drawn down on a film of Mylar (trademark). The coated film was dried and conditioned overnight at 65° F. and cut into strips. The pressure sensitive properties of the coated film were tested and found comparable to those of a conventionally prepared adhesive having the same solid composition but prepared at 50 percent solids.

What is claimed is:

1. A process for preparing an aqueous based pressure sensitive adhesive consisting of:

per 100 parts by weight of water, from about 80 to 120 parts by weight of a mixture comprising from about 85 to 15 parts by weight of one or more synthetic polymers; and from about 15 to 85 parts by weight of one or more water insoluble tackifier resins having a Tg greater than about 10° C.;

from about 2.0 to about 6.0 parts by weight of one or more plasticizers;

from about 0.4 to about 1.2 parts by weight of one or more emulsifiers;

from about 0.2 to about 0.6 parts by weight of one or more alkali metal hydroxides; and from about 0.5 to 0.15 parts by weight of a non silicone defoamer, from about 1 to 2 parts by weight of a dispersant which comprises heating said tackifier resin above its Tg and adding thereto said plasticizer and said emulsifier; compounding an emulsion of about 60 to 40 percent by weight of said polymer, said alkali metal hydroxide, dispersant and said defoamer; blending said compound with the mixture of said hot tackifier, plasticizer and emulsifier under conditions of very high shear and cooling the resulting aqueous based pressure sensitive adhesive to room temperature under mild agitation.

2. A process according to claim 1 wherein said polymer is selected from the group consisting of:

(A) polymers formed by polymerizing a mixture comprising:
  (i) from 0 to about 60 weight percent of a mixture of 100 to 65 weight percent of a $C_{8-12}$ vinyl or vinylidene aromatic monomer which is unsubstituted or substituted by a $C_{1-4}$ alkyl radical or a chlorine bromine atom and 0 to 35 weight percent of a $C_{2-8}$ alkenyl nitrile;
  (ii) from about 40 to 99 weight percent of a mixture comprising 100 to 50 weight percent of a $C_{4-8}$ conjugated diolefin which is unsubstituted or substituted by a chlorine atom and 50 to 0 weight percent of one or more members selected from the group consisting of a $C_{1-8}$ alkyl or hydroxyalkyl ester of acrylic or methacrylic acid, and $C_{2-8}$ alkenyl or hydroxy alkenyl esters of $C_{1-8}$ saturated carboxylic acids;
  (iii) from about 0.5 to 10 weight percent of one or more monomers selected from the group consisting of:
    (1) one or more $C_{3-6}$ ethylenically unsaturated carboxylic acids;
    (2) one or more amides of $C_{3-6}$ ethylenically unsaturated carboxylic acids, which amide is unsubstituted or substituted at the nitrogen atom by a $C_{1-4}$ alkyl or hydroxyalkyl radical;
    (3) one or more $C_{3-6}$ ethylenically unsaturated aldehydes; and
    (4) one or more $C_{1-6}$ alkyl or hydroxyalkyl esters of $C_{3-6}$ ethylenically unsaturated carboxylic acids;

(B) polymers formed by polymerizing a mixture comprising:
  (i) from about 60 to 99.5 weight percent of a $C_{1-8}$ alkyl or hydroxyalkyl ester of acrylic or methacrylic acid;
  (ii) from about 1 to 40 weight percent of one or more monomers selected from the group consisting of $C_{8-12}$ vinyl or vinylidene aromatic monomers which are unsubstituted or substituted by a $C_{1-4}$ alkyl radical or a chlorine or bromine atom, $C_{3-6}$ alkenyl nitriles; and acrylic and methacrylic acid;
  (iii) from about 0.5 to 10 weight percent of one or more monomers selected from the group consisting of:
    (1) one or more $C_{3-6}$ ethylenically unsaturated carboxylic acids;
    (2) one or more amides of $C_{3-6}$ ethylenically unsaturated carboxylic acids, which amide is unsubstituted or substituted at the nitrogen atom by a $C_{1-4}$ alkyl or hydroxyalkyl radical;
    (3) one or more $C_{3-6}$ ethylenically unsaturated aldehydes; and
    (4) one or more $C_{1-6}$ alkyl or hydroxyalkyl esters of $C_{3-6}$ ethylenically unsaturated carboxylic acids;

(C) polymers formed by polymerizing a mixture comprising (i) from about 1 to 40 weight percent of a $C_{2-3}$ mono olefin;
(ii) from about 99 to 60 weight percent of one or more monomers selected from the group consisting of $C_{2-8}$ alkenyl or hydroxy alkenyl esters of $C_{1-8}$ saturated carboxylic acids and $C_{1-8}$ alkyl or hydroxyalkyl esters of $C_{3-6}$ ethylenically unsaturated carboxylic acids; and
(iii) from about 0.5 to 10 weight percent of one or more monomers selected from the group consisting of:
  (1) one or more $C_{3-6}$ ethylenically unsaturated carboxylic acids;
  (2) one or more amides of $C_{3-6}$ ethylenically unsaturated carboxylic acids, which amide is unsubstituted or substituted at the nitrogen atom by a $C_{1-4}$ alkyl or hydroxyalkyl radical;
  (3) one or more $C_{3-6}$ ethylenically unsaturated aldehydes; and
  (4) one or more $C_{1-6}$ alkyl or hydroxyalkyl esters of $C_{3-6}$ ethylenically unsaturated carboxylic acids; and
(D) polymers formed by polymerizing a mixture comprising
  (i) from 20 to 40 weight percent of a $C_{3-8}$ alkenyl nitrile;
  (ii) from 79.5 to 60 weight percent of a $C_{4-8}$ conjugated diolefin; and
  (iii) from about 0.5 to 10 weight percent of one or more monomers selected from the group consisting of:
    (1) one or more $C_{3-6}$ ethylenically unsaturated carboxylic acids;
    (2) one or more amides of $C_{3-6}$ ethylenically unsaturated carboxylic acids, which amide is unsubstituted or substituted at the nitrogen atom by a $C_{1-4}$ alkyl or hydroxyalkyl radical;
    (3) one or more $C_{3-6}$ ethylenically unsaturated aldehydes; and
    (4) one or more $C_{1-6}$ alkyl or hydroxyalkyl esters of $C_{3-6}$ ethylenically unsaturated carboxylic acids.

3. A process according to claim 2 wherein the insoluble tackifier is selected from the group consisting of
(A) rosin, disproportionated rosin, hydrogenated rosin esters, glycerol esters of rosin, pentaerythritol and the polyterpene resins having a ring and ball softening point from about 25° C. to about 115° C.; and
(B) synthetic hydrocarbon tackifying resins having a ring and ball softening temperature from about 10° to 100° C. manufactured from a $C_9$ monomer or a $C_5$ monomer.

4. A process according to claim 3 wherein said plasticizer is selected from the group consisting of di-octyl phthalate, butyl benzyl-phthalate; distilled tall oils, castor oil, palm oil, olive oil, octyl tallate, glycerol, glycerol ethers, dipropylene glycol dibenzoate, and diethyl glycol dibenzoate.

5. A process according to claim 4 wherein the alkali metal hydroxide is potassium hydroxide and the emulsifier is an anionic emulsifier.

6. A process according to claim 5 wherein said tackifier is rosin or a hydrogenated rosin ester.

7. A process according to claim 6 wherein said polymer is formed by polymerizing a mixture comprising:
  20 to 40 weight percent of styrene or alpha methyl styrene;
  45 to 75 weight percent of one or more monomers selected from the group consisting of butadiene, isoprene, chlorinated isoprene; and from about 0.5 to 5 weight percent of one or more monomers selected from the group consisting of acrylic acid, methacrylic acid, itaconic acid, fumaric acid, methyl acrylate, methyl methacrylate, ethyl acrylate, ethyl methacrylate, butyl acrylate, ethyl hexyl methacrylate, acrylamide, methacrylamide, N-methylol acrylamide, N-methylol methacrylamide, and acrolein.

8. A process according to claim 7 wherein said polymer has a molecular weight distribution so that from about 20 to 55 weight percent of the polymer has a molecular weight greater than 320,000.

9. A process according to claim 6 wherein said polymer is formed by polymerizing a mixture comprising from about 5 to 25 weight percent of a $C_{2-3}$ mono olefin;
  from about 74.5 to 94.5 weight percent of a $C_{2-8}$ alkenyl or hydroxy alkenyl ester of a $C_{1-8}$ saturated carboxylic acid; and from about 0.5 to 5 weight percent of one or more monomers selected from the group consisting of acrylic acid, methacrylic acid, itaconic acid, fumaric acid, methyl acrylate, methyl methacrylate, ethyl acrylate, ethyl methacrylate, butyl acrylate, ethyl hexyl methacrylate, acrylamide, methacrylamide, N-methylol acrylamide, N-methylol methacrylamide, and acrolein.

10. A process according to claim 6 wherein said polymer is formed by polymerizing a mixture comprising:
  from about 85 to 95 weight percent of a $C_{1-8}$ alkyl or hydroxyalkyl ester of acrylic or methacrylic acid;
  from about 5 to 15 weight percent of acrylic or methacrylic acid; and
  from about 0.5 to 5 weight percent of one or more monomers selected from the group consisting of itaconic acid, fumaric acid, acrylamide, methacrylamide, N-methylol acrlamide, N-methylol methacrylamide, and acrolein.

11. A process according to claim 6 wherein said polymer is formed by polymerizing a mixture comprising:
  from 5 to 25 weight percent of a $C_{2-3}$ mono olefin;
  from about 74.5 to 94.5 weight percent of a $C_{1-8}$ alkyl or hydroxy alkyl ester of a $C_{3-6}$ ethylenically unsaturated carboxylic acid; and
  from about 0.5 to 5 weight percent of one or more monomers selected from the group consisting of acrylic acid, methacrylic acid, itaconic acid, fumaric acid, acrylamide, methacrylamide, N-methylol acrylamide, N-methylol methacrylamide and acrolein.

* * * * *